July 17, 1928.  1,677,556
J. H. GROETSCH
LAWN MOWER SHARPENER
Filed March 13, 1926    2 Sheets-Sheet 1

Inventor
J. H. Groetsch,
By Clarence A. O'Brien
Attorney

July 17, 1928.  
J. H. GROETSCH  
LAWN MOWER SHARPENER  
Filed March 13, 1926

Inventor  
J. H. Groetsch,

By Clarence A. O'Brien  
Attorney

Patented July 17, 1928.

1,677,556

UNITED STATES PATENT OFFICE.

JOHN H. GROETSCH, GAYLORD, MINNESOTA.

LAWN-MOWER SHARPENER.

Application filed March 13, 1926. Serial No. 94,527.

This invention relates to an improvement for lawn mowers of the rotary type whereby the blades may be sharpened during the movement of the mower over the ground, and the primary object of the invention is to substantially improve and simplify sharpeners of this general character.

To the attainment of this end this device comprises generally a member for rigid attachment to the mower brace bar that extends between the wheels at the top side thereof, and has means for supporting an emery block, said means being operable to engage or disengage the block with the cutter blades, as desired.

A further object is to provide means as a part of the attachment whereby the emery block will be maintained in position to be engaged by the blades during the turning of the same when the attachment is so adjusted as to permit of the engagement.

An additional object is to provide an attachment whereby emery blocks of various lengths may be associated therewith for obviously enabling the use of the attachment with lawn mowers of various sizes.

Other objects will become apparent as the nature of the invention is better understood, the same comprising the novel form, combination, and arrangement of parts hereinafter more fully described, shown in the accompanying drawings and claimed.

In the drawings wherein like reference characters indicate corresponding parts throughout the several views.

Figure 1:
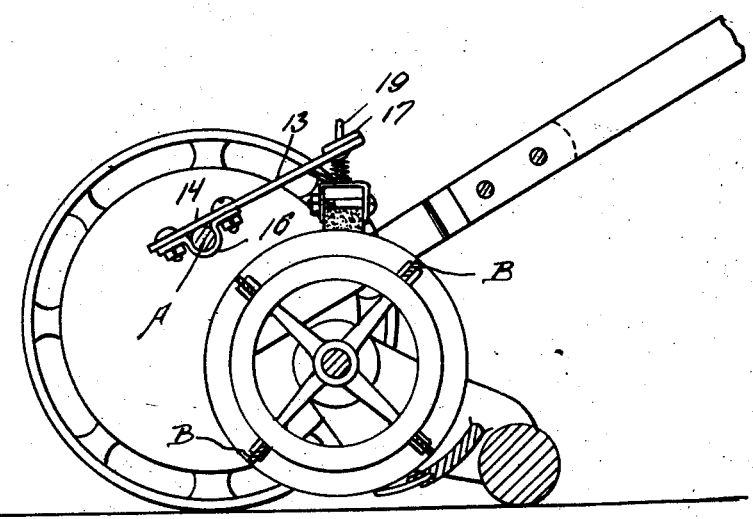
Figure 1 is a sectional view of the conventional form of lawn mower equipped with my improved sharpener.
Figure 4:
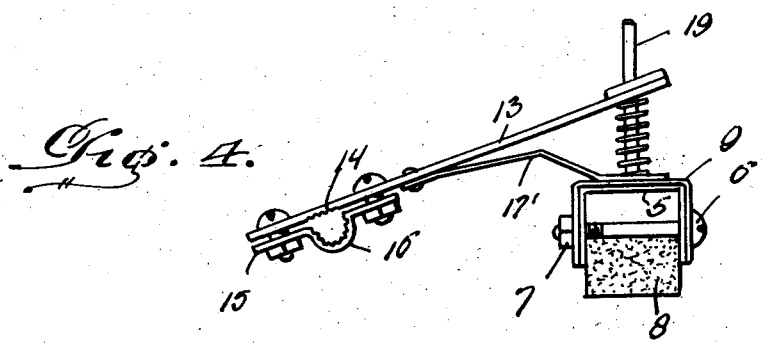
Figure 4 is an edge view of the sharpener.
Figure 5:
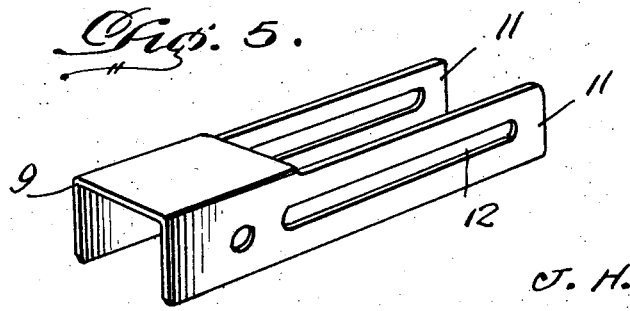
Figure 5 is a perspective view of one of the end members of the emery block holder, said end members being provided so as to permit of the longitudinal adjustment of the holder for receiving emery blocks of various lengths depending upon the size of the particular mower with which the attachment is used.

Now having particular reference to the drawings my novel attachment constitutes the provision of a relatively elongated sheet metal boxing 5 that is of inverted U-construction and that is provided at spaced points with transversely extending bolts 6 upon the inner threaded ends of which are arranged nuts 7 in order that the side walls of the boxing may be sprung together for securing a block of emery 8 therein, it being noted from a consideration of Figures 1 and 4 that said bolts serve as a backing for the block of emery.

Slidably arranged upon the opposite ends of the boxing are end members 9—9 that are similar in cross sectional shape to said boxing, and each of the same is provided with a cross bolt 10 for purposes similar to the cross bolt 6 of said boxing 5. The side walls of the end members are formed with longitudinal extensions 11—11 that are horizontally slotted as at 12 through which the ends of the bolts 6 extend for serving as a means for rigidly securing said end members to the boxing when the same have been moved inwardly and outwardly with respect thereto to the desired degree for accommodating emery blocks of various length.

Figure 2:
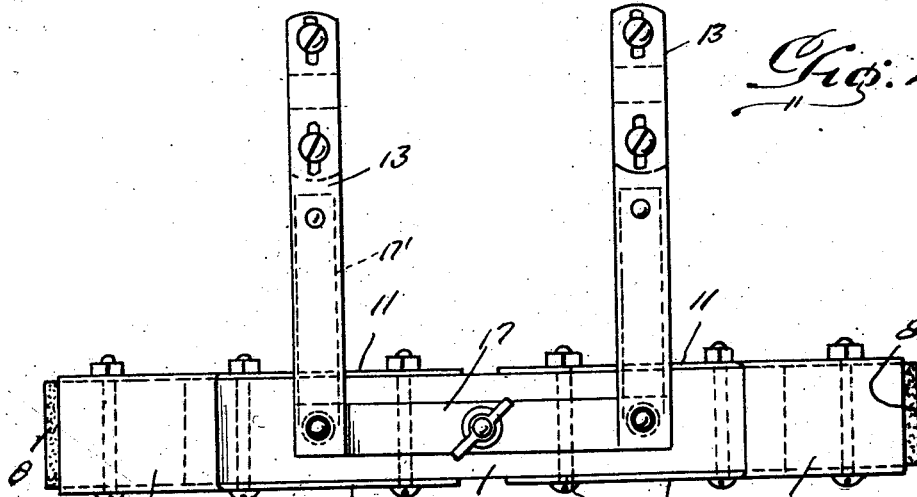
Figure 2 is a top plan view of the sharpener per se.
Figure 3:
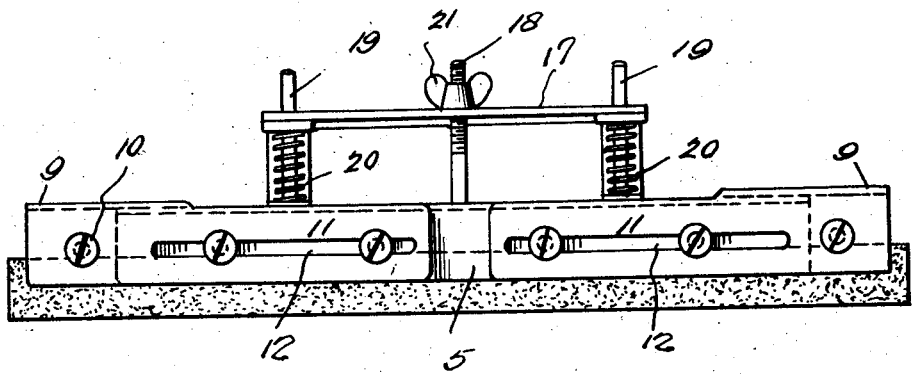
Figure 3 is a front end elevation thereof.

The attachment further constitutes the provision of a pair of spaced rigid metal bars 13—13, the under sides of which are toothed adjacent their ends as at 14, in Figure 4, while arranged upon the under side of each bar at said end is a clamp bracket 15 in the form of a strip of metal bent intermediate its ends as to provide a loop 16 the inner side of which is toothed also as disclosed in Figure 4. The clamp bracket is secured to its respective bar through the medium of bolt and nut connections, and as clearly shown in Figure 1, said bars are adapted to be rigidly connected to the mower brace bar A by reason of the clamp brackets as is obvious. At the points of attachment of each bar 13 with respective clamp bracket 16 said bar is slotted as is clearly shown in Figure 2 in order that the proper disposition of the emery block with respect to the knives of the cutting reel may be secured. The bars 13—13 are so connected to the mower brace bar as to extend rearwardly in an upward inclined direction with respect thereto, the forward ends of the bars being interconnected by means of a cross bars 17 that is formed intermediate its ends with an opening through which projects a threaded bolt 18 extending directly vertically from the emery block boxing 5 and intermediate the ends thereof, Figures 2 and 3.

It is necessary that the opening in the cross bar 17 be formed on a slight angle in order that the emery block 8 be maintained in such a position as to be properly engaged by the blade B of the mower during the movement of the same over the ground.

The emery block boxing 5 and the supporting bars 13—13 are interconnected by leaf springs 17' that are rigidly connected at their opposite ends to the top side of the boxing and the under side of the bars as shown in the end view, Figure 4, said leaf springs serving to normally maintain the emery blocks in position to be engaged by the blades, but permitting the same to be raised for accommodating the same to uneven surfaces of the blades that exist in some mowers.

Anchored to the emery block boxing at opposite sides of the bolt 18 and projecting vertically therefrom are pins 19—19 that extend through registering openings in the forward ends of the bars 13—13 and the opposite ends of the connecting bar 17 for serving as guides for the boxing and causing the movement of the same upwardly and downwardly in a true vertical plane. Surrounding these pins beneath the bars are expansible coil springs 20—20 that assist the leaf springs 17' in maintaining the boxing in a downward direction with respect to said bars 13—13.

Threaded upon the projecting end of the threaded bolt 18 is a wing nut 21 that serves as a means for limiting the downward movement of the boxing with respect to the bars and that also serves as a means for raising said boxing when the nut is turned downwardly for disengaging the emery block from the blade when it is not necessary to sharpen the same.

From the foregoing description when considered in conjunction with the accompanying drawing it is believed that the operation and advantages of a lawn mower sharpener of this type will be readily appreciated by those skilled in the art, and that all the advantages heretofore attributed are present in an attachment of this character.

Even though I have herein shown and described my sharpener as comprising certain detailed structural elements, it is however to be understood that departures may be had therefrom without effecting the spirit and scope of the appended claim.

Having thus described my invention, what I claim as new and desire to secure by Letters Patent is:—

In a lawn mower sharpener of the character described, an emery block receiving boxing of inverted U-shape, a pair of end members having inverted U-shaped body portions with extensions on the sides thereof, said extensions adapted to straddle the boxing, said extensions formed with slots, and bolts extending through the slots and through openings in the boxing to contract the sides of the end members and the boxing for holding an emery block and simultaneously for holding the end members in proper adjusted position in relation to the boxing.

In testimony whereof I affix my signature.

JOHN H. GROETSCH.